United States Patent
Zhao et al.

(10) Patent No.: US 8,335,499 B1
(45) Date of Patent: Dec. 18, 2012

(54) APPARATUS AND METHODS FOR CONTROLLING DEDICATED DATA TRANSMIT MODE IN A MOBILE COMPUTING DEVICE

(75) Inventors: Wen Zhao, Cupertino, CA (US); Isabel Mahe, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 877 days.

(21) Appl. No.: 11/613,107

(22) Filed: Dec. 19, 2006

(51) Int. Cl.
*H04M 3/00* (2006.01)

(52) U.S. Cl. .................. 455/418; 455/414.4; 455/435.3; 455/417; 455/527

(58) Field of Classification Search .................. 455/418, 455/552.1, 414.4, 435.3, 512, 527, 417
See application file for complete search history.

(56) References Cited

U.S. PATENT DOCUMENTS

| | | | |
|---|---|---|---|
| 5,590,406 A * | 12/1996 | Bayley et al. | 370/493 |
| 6,799,050 B1 * | 9/2004 | Krasner | 455/456.1 |
| 6,944,461 B2 * | 9/2005 | Bl et al. | 455/452.2 |
| 2004/0077351 A1 * | 4/2004 | Inoue et al. | 455/444 |
| 2004/0085922 A1 * | 5/2004 | Herle | 370/328 |
| 2004/0205749 A1 * | 10/2004 | Dalton et al. | 717/178 |
| 2007/0042771 A1 * | 2/2007 | Xiang | 455/428 |
| 2007/0171909 A1 * | 7/2007 | Pignatelli | 370/392 |
| 2007/0173283 A1 * | 7/2007 | Livet et al. | 455/552.1 |
| 2008/0014938 A1 * | 1/2008 | Hart et al. | 455/435.1 |

* cited by examiner

*Primary Examiner* — Kamran Afshar
*Assistant Examiner* — Khalid Shaheed

(57) ABSTRACT

Various embodiments for controlling dedicated data transmit mode (DDTM) in a mobile computing device are described. In one or more embodiments, the mobile computing device may support cellular voice communication and wireless data communication. The mobile computing device may comprise a DDTM control module coupled to a DDTM application. The DDTM application may prevent mobile terminated cellular voice communication from interrupting ongoing data communication when enabled. The DDTM control module may be configured to enable and disable the DDTM application. Other embodiments are described and claimed.

28 Claims, 2 Drawing Sheets

200

SELECT ONE OR MORE APPLICATION TYPES
FOR WHICH TO ENABLE OR DISABLE DDTM
202

DETERMINE A PARTICULAR APPLICATION TYPE
204

ENABLE AND DISABLE DDTM
BASED ON THE APPLICATION TYPE
206

ACCESS QOS DATABASE
302

OBTAIN ONE OR MORE QOS REQUIREMENTS
304

ENABLE AND DISABLE DDTM
BASED ON THE ONE OR MORE QOS
REQUIREMENTS
306

FIG. 3

APPARATUS AND METHODS FOR CONTROLLING DEDICATED DATA TRANSMIT MODE IN A MOBILE COMPUTING DEVICE

BACKGROUND

A mobile computing device such as a combination handheld computer and mobile telephone or smart phone generally may provide voice and data communications functionality, as well as computing and processing capabilities. For example, a mobile computing device may support cellular communication over cellular network such as a Code Division Multiple Access (CDMA) network as well as Evolution Data Optimized (EVDO) data communication over a wireless radio channel.

In some cases, a mobile computing device may be required to implement a dedicated data transmit mode (DDTM) to preempt voice communication in favor of data communication. While the DDTM may allow the user of the mobile computing device to receive data without interruption, the user is prevented from receiving incoming cellular voice calls until an established data communications session is terminated. Accordingly, there exists the need for an improved apparatus and methods for controlling DDTM in a mobile computing device.

BRIEF DESCRIPTION OF THE DRAWINGS

FIG. 2 illustrates a logic flow in accordance with one or more embodiments.

FIG. 3 illustrates a logic flow in accordance with one or more embodiments.

DETAILED DESCRIPTION

Figure 1:
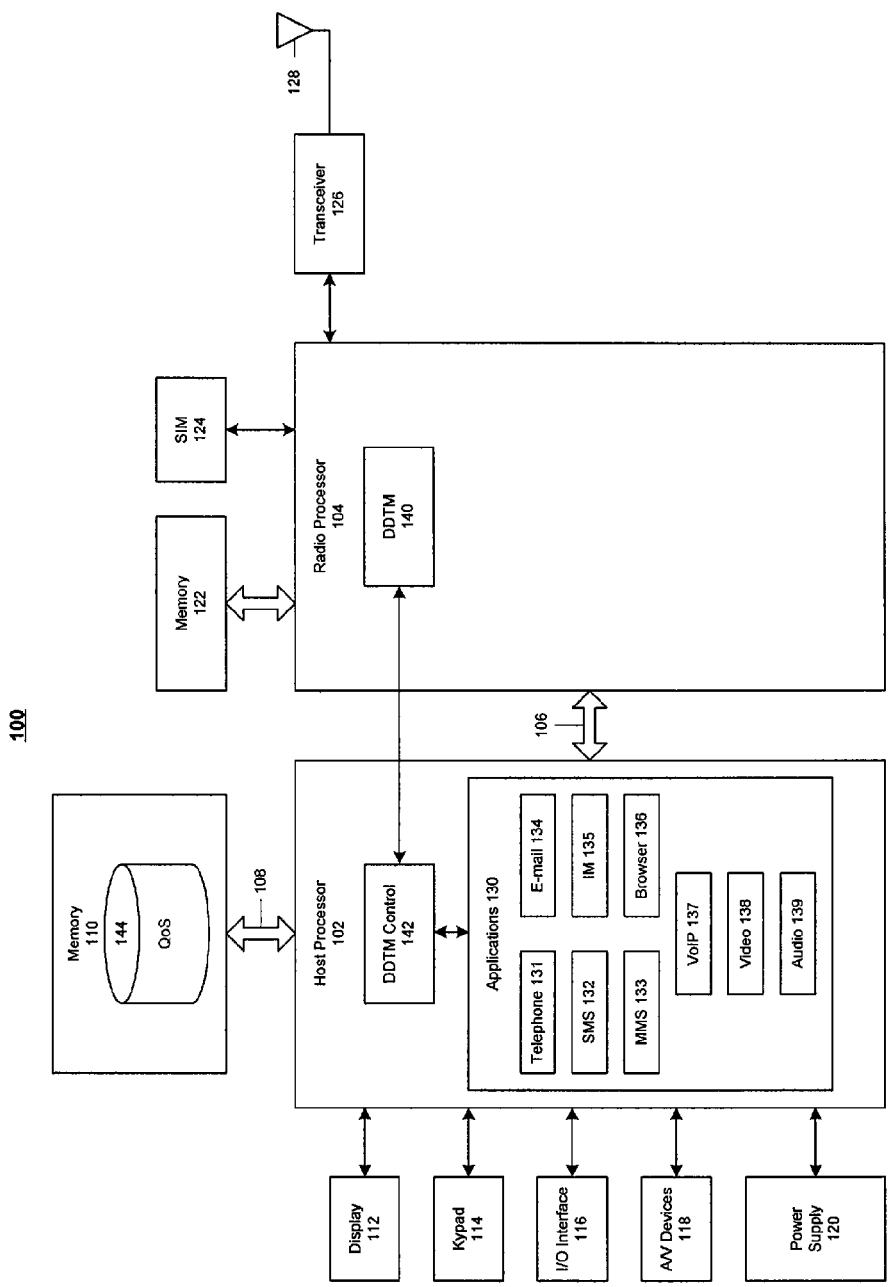
FIG. 1 illustrates a mobile computing device in accordance with one or more embodiments.

Various embodiments are directed to controlling dedicated data transmit mode (DDTM) in a mobile computing device. In one or more embodiments, the mobile computing device may support cellular voice communication and wireless data communication. The mobile computing device may comprise a DDTM control module coupled to a DDTM application. The DDTM application may prevent cellular voice communication when enabled. The DDTM control module may be configured to enable and disable the DDTM application.

FIG. 1 illustrates a mobile computing device 100 in accordance with one or more embodiments. The mobile computing device 100 may be implemented as a combination handheld computer and mobile telephone, sometimes referred to as a smart phone. Examples of smart phones include, for example, Palm® products such as Palm® Treo™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

The mobile computing device 100 may provide voice communications functionality in accordance with different types of cellular radiotelephone systems. Examples of cellular radiotelephone systems may include CDMA systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth.

In addition to voice communications functionality, the mobile computing device 100 may be arranged to provide WWAN data communications functionality in accordance with different types of cellular radiotelephone systems. Examples of cellular radiotelephone systems offering WWAN data communications services may include EV-DO systems, Evolution For Data and Voice (EV-DV) systems, CDMA/1xRTT systems, GSM with General Packet Radio Service (GPRS) systems (GSM/GPRS), Enhanced Data Rates for Global Evolution (EDGE) systems, High Speed Downlink Packet Access (HSDPA) systems, High Speed Uplink Packet Access (HSUPA), and so forth.

The mobile computing device 100 may be arranged to provide data communications functionality in accordance with different types of WLAN systems. Examples of suitable WLAN systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 100 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electro-magnetic induction (EMI) techniques. An example of EMI techniques may include passive or active radio-frequency identification (RFID) protocols and devices.

As shown in the embodiment of FIG. 1, the mobile computing device 100 may comprise a dual-processor architecture including a host processor 102 and a radio processor 104. The host processor 102 may be arranged to provide processing or computing resources to the mobile computing device 100. The radio processor 104 may be responsible for performing various voice and data communications operations for the mobile computing device 100 such as transmitting and receiving voice and data information over one or more wireless communications channels. In various implementations, the host processor 102 and the radio processor 104 may be arranged to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth. Although some embodiments may be described as comprising a dual-processor architecture for purposes of illustration, it is worthy to note that the mobile computing device 100 may comprise any suitable processor architecture and/or any suitable number of processors consistent with the described embodiments.

The host processor 102 may be responsible for executing various software programs such as system programs and application programs to provide computing and processing operations for the mobile computing device 100. System programs generally may assist in the running of the mobile computing device 100 and may be directly responsible for controlling, integrating, and managing the individual hardware components of the computer system. Examples of system programs may include, without limitation, an operating system (OS), device drivers, programming tools, utility programs, software libraries, application programming interfaces (APIs), and so forth. The mobile computing device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Application programs generally may allow a user to accomplish one or more specific tasks. In various implementations, the application programs may provide one or more graphical user interfaces (GUIs) to communicate information between the mobile computing device 100 and a user. Examples of application programs may include, without limitation, one or more messaging applications (e.g., telephone, voicemail, facsimile, e-mail, IM, SMS, MMS, video conferencing), web browser applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth.

In some embodiments, application programs may comprise upper layer programs running on top of the OS of the host processor 102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication. Although a TCP/IP/PPP protocol data stack may be employed in various implementations, it can be appreciated that other suitable types of transport layers, network layers, and/or link layers may be used in accordance with the described embodiments.

The host processor 102 may be implemented as a host central processing unit (CPU) using any suitable processor or logic device, such as a as a general purpose processor. Although some embodiments may be described with the host processor 102 implemented as a CPU or general purpose processor by way of example, it may be appreciated that the embodiments are not limited in this context. For example, the host processor 102 may comprise, or be implemented as, a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 102 may be coupled through a memory bus 108 to a memory 110. The memory bus 108 may comprise any suitable interface and/or bus architecture for allowing the host processor 102 to access the memory 110. Although the memory 110 may be shown as being separate from the host processor 102 for purposes of illustration, it is worthy to note that in various embodiments some portion or the entire memory 110 may be included on the same integrated circuit as the host processor 102. Alternatively, some portion or the entire memory 110 may be disposed on an integrated circuit or other medium (e.g., hard disk drive) external to the integrated circuit of host processor 102. In various embodiments, the mobile computing device 100 may comprise an expansion slot to support a multimedia and/or memory card, for example.

The memory 110 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 100 may comprise a display 112 coupled to the host processor 102. The display 112 may comprise any suitable visual interface for displaying content to a user of the mobile computing device 100. In one embodiment, for example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

The mobile computing device 100 may comprise an alphanumeric keypad 114 coupled to the host processor 102. The keypad 114 may comprise, for example, a QWERTY key layout and an integrated number dial pad. The mobile computing device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth.

The mobile computing device 100 may comprise an input/output (I/O) interface 116 coupled to the host processor 102. The I/O interface 116 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, mobile computing device 100 may be arranged to transfer and/or synchronize information with the local computer system.

The host processor 102 may be coupled to various audio/video (A/V) devices 118 that support A/V capability of the mobile computing device 100. Examples of A/V devices 118 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 120 arranged to supply and manage power to the elements of the mobile computing device 100. In various embodiments, the power supply 120 may be implemented by a rechargeable battery, such as a removable and rechargeable lithium ion battery to provide direct current (DC) power, and/or an alternating current (AC) adapter to draw power from a standard AC main power supply.

The mobile computing device 100 may comprise a memory 122 coupled to the radio processor 104. The memory 122 may be implemented using one or more types of machine-readable or computer-readable media capable of storing data such as volatile memory or non-volatile memory, removable or non-removable memory, erasable or non-erasable memory, writeable or re-writeable memory, and so forth. The memory 122 may comprise, for example, flash memory and secure digital (SD) RAM. Although the memory 122 may be shown as being separate from and external to the radio processor 104 for purposes of illustration, it is worthy to note that in various embodiments some portion or the entire memory 122 may be included on the same integrated circuit as the radio processor 104.

The mobile computing device 100 may comprise a subscriber identity module (SIM) 124 coupled to the radio processor 104. The SIM 124 may comprise, for example, a removable or non-removable smart card arranged to encrypt voice and data transmissions and to store user-specific data for allowing a voice or data communications network to identify and authenticate the user. The SIM 124 also may store data such as personal settings specific to the user.

As mentioned above, the radio processor 104 may perform voice and/or data communication operations for the mobile computing device 100. For example, the radio processor 104 may be arranged to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments.

In various embodiments, the radio processor 104 may perform analog and/or digital baseband operations for the mobile computing device 100. For example, the radio processor 104 may perform digital-to-analog conversion (DAC), analog-to-digital conversion (ADC), modulation, demodulation, encoding, decoding, encryption, decryption, and so forth.

As shown in FIG. 1, the mobile computing device 100 may comprise a transceiver module 126 coupled to the radio processor 104. The transceiver module 126 may comprise one or more transceivers or components arranged to communicate using different types of protocols, communication ranges, operating power requirements, RF sub-bands, information types (e.g., voice or data), use scenarios, applications, and so forth. The transceiver module 126 generally may be implemented using one or more chips as desired for a given implementation. Although the transceiver module 126 may be shown as being separate from and external to the radio processor 104 for purposes of illustration, it is worthy to note that in various embodiments some portion or the entire transceiver module 126 may be included on the same integrated circuit as the radio processor 104. The embodiments are not limited in this context.

The transceiver module 126 may comprise, for example, one or more cellular transceivers or components arranged to support communication over a cellular voice channel for a system such as a CDMA, GSM, and/or UMTS cellular system. The transceiver module 126 also may comprise one or more WWAN transceivers or components arranged to support data communication over a WWAN data channel in accordance with one or more WWAN protocols such as EV-DO protocols, EVDV protocols, CDMA/1xRTT protocols, GSM/GPRS protocols, EDGE protocols, HSDPA protocols, and so forth. The transceiver module 126 also may comprise one or more transceivers or components arranged to support data communication over a WLAN data channel in accordance with one or more WLAN protocols such as IEEE 802.11a/b/g/n protocols, IEEE 802.16 protocols, IEEE 802.20 protocols, PAN protocols, Infrared protocols, Bluetooth protocols, EMI protocols including passive or active RFID protocols, and so forth. In some implementations, the transceiver module 126 may comprise a Global Positioning System (GPS) transceiver to support position determination and/or location-based services.

The mobile computing device 100 may comprise an antenna system 128 for transmitting and/or receiving electrical signals. As shown, the antenna system 128 may be coupled to the radio processor 104 through the transceiver module 126. The antenna system 128 may comprise or be implemented as one or more internal antennas and/or external antennas.

As shown in FIG. 1, the mobile computing device 100 may comprise or implement various applications 130 including, for example, a telephone application 131 such as a CDMA, GSM, and/or UMTS cellular telephone application, a short message service (SMS) application 132, a multimedia message service (MMS) application 133, an e-mail application 134, an instant messaging (IM) application 135, and a browser application 136. The applications 130 also may comprise, for example, a Voice over Internet Protocol (VoIP) application 137, a video application 138 such as a streaming video player (e.g., Internet television application) or video conferencing application, and an audio application 139 such as a streaming audio player (e.g., Internet radio application) or audio teleconferencing application. It is to be understood that the embodiments are not limited in this regard, and that the applications 130 may include any other type of messaging or communications application which is consistent with the described embodiments.

The mobile computing device 100 may comprise or implement a DDTM application 140. When enabled, the DDTM application 140 may be arranged to favor data communication over voice communications. For example, the DDTM application 140 may be arranged to detect the invocation and/or initiation of a data communications session and to prevent the mobile computing device 100 from receiving incoming cellular voice calls until the data communications session concludes and/or is terminated. Accordingly, after a data communications session is invoked and/or initiated, the user of the mobile computing device 100 will not be interrupted by incoming cellular voice calls until an established data communications session is terminated. It can be appreciated that this data only mode of operation may be advantageous in some situations but not others.

The mobile computing device 100 may comprise or implement a DDTM control module 142 coupled to the DDTM application 140. The DDTM control module 142 may comprise, for example, hardware and/or software such as DDTM control logic (e.g., instructions, data, and/or code) to be executed by a logic device (e.g., host processor 102). The logic may be stored internally or externally to the logic device on one or more types of computer-readable storage media. In one or more embodiments, the DDTM control module 142 may be implemented as a DDTM application programming interface (API) on the host processor 102. In such embodiments, the DDTM control module 142 may comprise a remote API with respect to the radio processor 104.

The DDTM control module 142 may be arranged to automatically and/or selectively enable and disable the function of the DDTM application 140. In various embodiments, the DDTM control module 142 may be configured to enable or disable the function of the DDTM application 140 based on the type of application launched and/or being run by the mobile computing device 100 and/or the host processor 102. For example, the DDTM control module 142 may be arranged to detect the invocation and/or initiation of one or more of the applications 130 and to enable or disable the DDTM application 140 based on the particular type of application.

In various embodiments, the user of the mobile computing device 100 may configure DDTM preferences for the DDTM control module 142 to select which of the applications 130 are to have the DDTM application 140 enabled and/or disabled. The DDTM preferences also may include default settings as to particular messaging and/or communications applications. In some implementations, the user may be prompted to enable and/or disable the DDTM application 140 when a particular type of application is launched.

In one embodiment, for example, the DDTM control module 142 may be configured to automatically and/or selectively enable the DDTM application 140 for one or more of the VoIP application 137, the video application 138, and the audio application 139. In various implementations, the DDTM control module 142 may be configured to disable the DDTM application 140 by default until such applications are launched. Accordingly, when the mobile computing device 100 launches and/or is running at least one of the VoIP application 137, the video application 138, and the audio application 139, the DDTM control module 142 (e.g., DDTM API) may be arranged to communicate with the radio processor 104 and enable the DDTM application 140. When such applications are closed, the DDTM control module 142 may communicate with the radio processor 104 to disable the DDTM application 140. In such an embodiment, the user will not be interrupted by incoming cellular voice calls when the mobile computing device 100 is communicating using the VoIP application 137, receiving video content using the video application 138 (e.g., Internet television application), and/or receiving audio content using the audio application 139.

In this embodiment, the DDTM control module 142 may be configured to automatically and/or selectively disable the DDTM application 140 for one or more of the SMS application 132, the MMS application 133, the e-mail application 134, the IM application 135, and the browser application 136. In various implementations, the DDTM control module 142 may be configured to disable the DDTM application 140 for such applications by default. Accordingly, the user may receive incoming cellular voice calls when using the SMS application 132, the MMS application 133, the e-mail application 134, the IM application 135, and/or the browser application 136. It is to be understood that the embodiments are not limited in this regard, and that the DDTM control module 142 may be configured in various ways which are consistent with the described embodiments. For example, the DDTM control module 142 may be configured to disable the DDTM application 140 for any type of application which generally may be run as background task when performing cellular voice communication.

In one or more embodiments, the DDTM control module 142 may be configured to enable and disable the function of the DDTM application 140 based on one or more Quality of Service (QoS) requirements. In various implementations, the DDTM control module 142 may be arranged to access a QoS database 144. The QoS database 144 may comprise any type of data structure (e.g., array, file, table, record) and may be implemented by various types of storage media (e.g., memory 110, memory 122). The QoS database 144 may be arranged to store a QoS matrix associating QoS requirements with one or more applications 130, data types, and/or media content. In some cases, the QoS matrix may be related to and/or specified by one or more wireless standards such as EVDO or UMTS wireless standards.

In various implementations, the QoS matrix may comprise static and/or dynamic QoS indicators for one or more of the applications 130, data types, and/or media content. The QoS indicators may comprise, for example, various metrics or requirements for bandwidth, data delivery (e.g., bit rate, frame rate), data loss (e.g., lost packets), blocked data rate, latency, transmission delay (e.g., delay jitter, inter-arrival jitter), video quality, audio quality, resolution, data compression, and so forth. In such implementations, the QoS indicators may be used by the radio processor 104 for resource allocation and/or prioritization for one or more of the applications 130, data types, and media content. For example, the radio processor 104 may provide the most bandwidth for applications, data types, and/or media content having the highest QoS requirements.

In various embodiments, the DDTM control module 142 may be configured to enable and disable the function of the DDTM application 140 based on the QoS matrix and/or QoS indicators. For example, the DDTM control module 142 may be configured to examine QoS indicators for various applications 130, data types, and media content and to determine whether to enable or disable the function of the DDTM application 140 according to the QoS indicators. Because the radio processor 104 generally controls the QoS, the determination of whether to enable or disable the DTTM application 140 may be implemented at the radio processor layer in some cases.

By observing the QoS indicators, the DTTM control module 142 may enable the DDTM application 140 when QoS requirements are relatively high (e.g., at or above certain limits with respect to one or more QoS metrics). For applications requiring high bandwidth, fast transmission rates, and very short latency (e.g., VoIP, Internet TV, video conferencing, etc.), the QoS requirements for the mobile computing device 100 and/or radio processor 104 may be relatively high for such applications, data types, and/or media content. If the mobile computing device 100 and/or radio processor 104 requires relatively high QoS, the DDTM control module 142 may enable the DTTM application 140. Accordingly, in such cases, the mobile computing device 100 may be incapable of cellular voice communication.

On the other hand, if high QoS is not required by the mobile computing device 100 and/or the radio processor 104, the DDTM control module 142 may disable the DTTM application 140. For applications capable of being run as background tasks (e.g. e-mail, web browsing, contact downloads, etc.), the QoS requirements may be relatively low for such applications, data types, and/or media content. Accordingly, cellular voice communication and various types of data communication may occur at the same time and/or at different levels.

FIG. 2 illustrates a logic flow 200 in accordance with one or more embodiments. The logic flow 200 may be performed by various systems and/or devices and may be implemented as hardware, software, and/or any combination thereof, as desired for a given set of design parameters or performance constraints. For example, the logic flow 200 may be implemented by a logic device (e.g., processor) and/or logic (e.g., instructions, data, and/or code) to be executed by a logic device. For purposes of illustration, and not limitation, the logic flow 200 is described with reference to FIG. 1.

The logic flow 200 may comprise selecting one or more application types for which to enable or disable DDTM (block 202). In one or more embodiments, the DDTM may be enabled for an application type comprising at least one of a VoIP application 137, a video application 138, and an audio application 139. The DDTM may be disabled for an application type comprising at least one of an e-mail application 134 and a browser application 136. The embodiments, however, are not limited in this context.

The logic flow 200 may comprise determining a particular application type (block 204) and enabling and disabling a dedicated data transmit mode (DDTM) based on the application type (block 206). In one or more embodiments, the application type may be determined when one or more applications are launched. In various implementations, the DDTM may prevent cellular voice communication when enabled and may be implemented by a mobile computing device 100 that supports cellular voice communication and wireless data communication.

FIG. 3 illustrates a logic flow 300 in accordance with one or more embodiments. The logic flow 300 may be performed by various systems and/or devices and may be implemented as hardware, software, and/or any combination thereof, as desired for a given set of design parameters or performance constraints. For example, the logic flow 300 may be implemented by a logic device (e.g., processor) and/or logic (e.g., instructions, data, and/or code) to be executed by a logic device. For purposes of illustration, and not limitation, the logic flow 300 is described with reference to FIG. 1. The embodiments are not limited in this context.

The logic flow 300 may comprise accessing a QoS database 144 (block 302). In one or more embodiments, the QoS database 144 may be arranged to store a QoS matrix comprising QoS indicators to be used to determine when to enable and disable the DDTM.

The logic flow 300 may comprise obtaining one or more quality of service (QoS) requirements (block 304) and enabling and disabling the DDTM based on the one or more QoS requirements (block 306). In one or more embodiments, the DDTM may prevent cellular voice communication when enabled and may be implemented by a mobile computing device 100 that supports cellular voice communication and wireless data communication. In various implementations, the DDTM may be enabled for relatively high QoS requirements and may be disabled for relatively low QoS requirements.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A mobile computing device to support cellular voice communication and wireless data communication, the mobile computing device comprising:
    a dedicated data transmit mode (DDTM) control module coupled with a DDTM application, the DDTM application operative to prevent mobile terminated cellular voice communication from interrupting ongoing data communication when enabled, the DDTM control module operative to enable and disable the DDTM application based on a particular application type running on the mobile computing device and one or more quality of service (QoS) requirements; and
    wherein the DDTM application, when enabled, prevents voice communication from being initiated during the time between the initiation of a data communications session and the termination of that session.

2. The mobile computing device of claim 1, the DDTM control module comprising an application programming interface (API) to the DDTM application.

3. The mobile computing device of claim 1, the DDTM control module operative to detect when one or more applications are launched and closed.

4. The mobile computing device of claim 1, the DDTM control module operative to enable the DDTM application for an application type comprising at least one of a Voice over Internet Protocol (VoIP) application, a video application, and an audio application.

5. The mobile computing device of claim 1, the DDTM control module operative to disable the DDTM application for an application type comprising at least one of an e-mail application and a browser application.

6. The mobile computing device of claim 1, the DDTM control module to enable the DDTM application for relatively high QoS requirements and to disable the DDTM application for relatively low QoS requirements.

7. The mobile computing device of claim 1, the DDTM control module to access a QoS database.

8. The mobile computing device of claim 7, the QoS database to store a QoS matrix comprising QoS indicators to be used by the DDTM control module to determine when to enable and disable the DDTM application.

9. A method comprising:
    obtaining one or more quality of service (QoS) requirements for an application running on a mobile device;
    determining a particular application type for the application running on a mobile device; and
    enabling and disabling a dedicated data transmit mode (DDTM) implemented by a mobile computing device based on the application type and the one or more QoS requirements, the mobile computing device supporting cellular voice communication and wireless data communication, the DDTM to prevent mobile terminated cellular voice communication from interrupting ongoing data communication when enabled; and
    wherein the DDTM, when enabled, prevents voice communication from being initiated during the time between the initiation of a data communications session and the termination of that session.

10. The method of claim 9, comprising selecting one or more application types for which to enable or disable the DDTM.

11. The method of claim 10, comprising selecting an application type comprising at least one of a Voice over Internet Protocol application, a video application, and an audio application for which to enable the DDTM.

12. The method of claim 10, comprising selecting an application type comprising at least one of an e-mail application and a browser application for which to disable the DDTM.

13. The method of claim 9, comprising detecting when one or more applications are launched and closed.

14. A method comprising:
    obtaining one or more quality of service (QoS) requirements for an application running on a mobile device; and
    enabling and disabling a dedicated data transmit mode (DDTM) implemented by a mobile computing device based on the one or more QoS requirements, the mobile computing device supporting cellular voice communication and wireless data communication, the DDTM to prevent mobile terminated cellular voice communication from interrupting ongoing data communication when enabled; and
    wherein the DDTM, when enabled, prevents voice communication from being initiated during the time between the initiation of a data communications session and the termination of that session.

15. The method of claim 14, comprising enabling the DDTM for relatively high QoS requirements.

16. The method of claim 14, comprising disabling the DDTM application for relatively low QoS requirements.

17. The method of claim 14, comprising accessing a QoS database.

18. The method of claim 17, the QoS database storing a QoS matrix comprising QoS indicators to be used by the DDTM control module to determine when to enable and disable the DDTM application.

19. A non-transitory computer-readable storage medium further comprising instructions that if executed enable a processor to:
    obtain one or more quality of service (QoS) requirements for an application running on a mobile device;
    determine a particular application type for the application running on a mobile device; and
    enable and disable a dedicated data transmit mode (DDTM) implemented by a mobile computing device based on the application type and the one or more QoS requirements, the mobile computing device supporting cellular voice communication and wireless data communication, the DDTM to prevent mobile terminated cellular voice communication from interrupting ongoing data communication when enabled; and
    wherein the DDTM application, when enabled, prevents voice communication from being initiated during the time between the initiation of a data communications session and the termination of that session.

20. The non-transitory storage medium of claim 19, further comprising instructions that if executed enable a processor to select one or more application types for which to enable or disable the DDTM.

21. The non-transitory storage medium of claim 20, further comprising instructions that if executed enable a processor to select an application type comprising at least one of a Voice over Internet Protocol application, a video application, and an audio application for which to enable the DDTM.

22. The non-transitory storage medium of claim 20, further comprising instructions that if executed enable a processor to select an application type comprising at least one of an e-mail application and a browser application for which to disable the DDTM.

23. The non-transitory storage medium of claim 19, further comprising instructions that if executed enable a processor to detect when one or more applications are launched and closed.

24. A non-transitory computer-readable storage medium further comprising instructions that if executed enable a processor to:
   obtain one or more quality of service (QoS) requirements for an application running on a mobile device; and
   enable and disable a dedicated data transmit mode (DDTM) implemented by a mobile computing device based the on one or more QoS requirements, the mobile computing device supporting cellular voice communication and wireless data communication, the DDTM, when enabled, to prevent cellular voice communication during the time between initiation of a data communications session and termination of that session.

25. The non-transitory storage medium of claim 24, further comprising instructions that if executed enable a processor to enable the DDTM for relatively high QoS requirements.

26. The non-transitory storage medium of claim 24, further comprising instructions that if executed enable a processor to disable the DDTM application for relatively low QoS requirements.

27. The non-transitory storage medium of claim 24, further comprising instructions that if executed enable a processor to access a QoS database.

28. The non-transitory storage medium of claim 27, the QoS database storing a QoS matrix comprising QoS indicators to be used by the DDTM control module to determine when to enable and disable the DDTM application.

* * * * *

UNITED STATES PATENT AND TRADEMARK OFFICE
CERTIFICATE OF CORRECTION

| | | |
|---|---|---|
| PATENT NO. | : 8,335,499 B1 | Page 1 of 1 |
| APPLICATION NO. | : 11/613107 | |
| DATED | : December 18, 2012 | |
| INVENTOR(S) | : Wen Zhao et al. | |

It is certified that error appears in the above-identified patent and that said Letters Patent is hereby corrected as shown below:

In column 13, line 15, in Claim 24, delete "the on" and insert -- on the --, therefor.

Signed and Sealed this
Nineteenth Day of March, 2013

Teresa Stanek Rea
*Acting Director of the United States Patent and Trademark Office*